(12) United States Patent
Miyazawa et al.

(10) Patent No.: US 10,782,502 B2
(45) Date of Patent: Sep. 22, 2020

(54) LENS BARREL AND IMAGE-CAPTURING DEVICE

(71) Applicant: Panasonic Intellectual Property Management Co., Ltd., Osaka (JP)

(72) Inventors: Ryo Miyazawa, Osaka (JP); Hiroyasu Fujinaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 78 days.

(21) Appl. No.: 16/317,537

(22) PCT Filed: Oct. 5, 2017

(86) PCT No.: PCT/JP2017/036295
§ 371 (c)(1),
(2) Date: Jan. 12, 2019

(87) PCT Pub. No.: WO2018/079221
PCT Pub. Date: May 3, 2018

(65) Prior Publication Data
US 2019/0293901 A1    Sep. 26, 2019

(30) Foreign Application Priority Data
Oct. 26, 2016    (JP) .................. 2016-210029

(51) Int. Cl.
*G02B 7/04*    (2006.01)
*G03B 5/02*    (2006.01)
*H04N 5/225*    (2006.01)

(52) U.S. Cl.
CPC .............. *G02B 7/04* (2013.01); *G03B 5/02* (2013.01); *H04N 5/225* (2013.01); *G03B 2205/0046* (2013.01)

(58) Field of Classification Search
CPC .......... G02B 7/102; G02B 7/023; G02B 7/08; G02B 7/10; G02B 7/021
(Continued)

(56) References Cited

U.S. PATENT DOCUMENTS

| 2010/0039717 A1 | 2/2010 | Ishimasa et al. |
| 2014/0185149 A1* | 7/2014 | Uno ...................... G02B 7/102 359/699 |
| 2015/0177479 A1* | 6/2015 | Lee .......................... G03B 3/10 359/824 |

FOREIGN PATENT DOCUMENTS

| JP | 11-119080 | 4/1999 |
| JP | 2013-064779 | 4/2013 |

(Continued)

OTHER PUBLICATIONS

International Search Report of PCT application No. PCT/JP2017/036295 dated Jan. 9, 2018.

*Primary Examiner* — Mohammed A Hasan
(74) *Attorney, Agent, or Firm* — Renner, Otto, Boisselle & Sklar, LLP (57) ABSTRACT

A lens barrel includes a lens frame unit movable along an optical axis, a guide pole configured to guide the lens frame unit along the optical axis of the lens frame unit, a first lens frame holding one end of the guide pole, a guide cover held by the first lens frame, and a fastening member fastening the guide cover to the first lens frame. The guide cover includes a protruding part holding the other end of the guide pole, and protruding along the optical axis. The fastening member fastens the guide cover to the first lens frame through the protruding part.

5 Claims, 10 Drawing Sheets

(58) Field of Classification Search
USPC .......................................................... 359/826
See application file for complete search history.

(56) References Cited

FOREIGN PATENT DOCUMENTS

| | | |
|---|---|---|
| JP | 2014-021411 | 2/2014 |
| JP | 2015-191123 | 11/2015 |
| WO | 2008/056766 | 5/2008 |

\* cited by examiner

LENS BARREL AND IMAGE-CAPTURING DEVICE

This application is a U.S. national stage application of the PCT International Application No. PCT/JP2017/036295 filed on Oct. 5, 2017, which claims the benefit of foreign priority of Japanese patent application No. 2016-210029 filed on Oct. 26, 2016, the contents all of which are incorporated herein by reference.

TECHNICAL FIELD

The present disclosure relates to a lens barrel and an image-capturing device using the lens barrel.

BACKGROUND ART

A conventionally known lens barrel includes a guide bar (guide pole) that supports a group moving frame (an example of a lens frame unit) in a movable manner along an optical axis, a group moving frame holding a group lens (an example of a drive lens frame), and a group barrel holding the guide bar (an example of a base frame) (For example, PTL 1).

CITATION LIST

Patent Literature

PTL 1: Unexamined Japanese Patent Publication No. 2015-191123

SUMMARY OF THE INVENTION

With the above-described conventional lens barrel, there is a demand for an image-capturing device equipped with a larger group lens. However, a size of a lens frame unit is limited when a base frame includes a large protruding part for holding a guide pole, which results in limitation to a size of a group lens. Whereas, limitation to a size of a group lens is reduced when a protruding part of a base frame is made thin, but strength of the protruding part of the base frame for holding a guide pole cannot be secured. When strength of a protruding part is not secured, an unusual noise is caused by vibration during imaging. Then, an image-capturing device may pick up such an unusual noise during imaging.

The present disclosure provides a lens barrel and an image-capturing device capable of securing strength of a guide cover and suppressing a shake of the guide cover with respect to a base frame.

The lens barrel according to an aspect of the present disclosure includes a lens frame unit movable along an optical axis, a guide pole configured to guide the lens frame unit along the optical axis of the lens frame unit, a base frame holding one end of the guide pole, a guide cover held by the base frame, and a fastening member fastening the guide cover to the base frame, in which the guide cover includes a protruding part protruding along the optical axis and holding the other end of the guide pole, and the fastening member fastens the guide cover to the base frame through the protruding part.

The present disclosure is capable of securing strength of the guide cover, and also suppressing a shake of the base frame with reference to the guide cover.

DESCRIPTION OF EMBODIMENT

An exemplary embodiment will be described in detail below with reference to the drawings as appropriate. However, detailed descriptions more than necessary may be omitted. For example, a detailed description of a matter which is already well-known, or a repetitive description for a substantially identical configuration may be omitted. This is to avoid unnecessary redundancy in the following description and to facilitate understanding by those skilled in the art.

The inventors of the present disclosure provide the accompanying drawings and the following description in order to allow those skilled in the art to fully understand the present disclosure, and do not intend to limit the subject matter described in the appended claims by the accompanying drawings and the following description.

It should also be noted that regarding the expression "substantially XX," for example, "substantially the same" is intended to include not only something that is exactly the same but also something that can be recognized as substantially the same. This is also applied to the expressions "near XX" and "about XX".

Further, each of the drawings is not necessarily strictly accurate. In addition, the same reference numerals denote substantially the same components, and repetitive descriptions will be omitted or simplified.

Exemplary Embodiment

A configuration of image-capturing device 1 according to an exemplary embodiment will be described below with reference to FIGS. 1 to 8.

Figure 1:
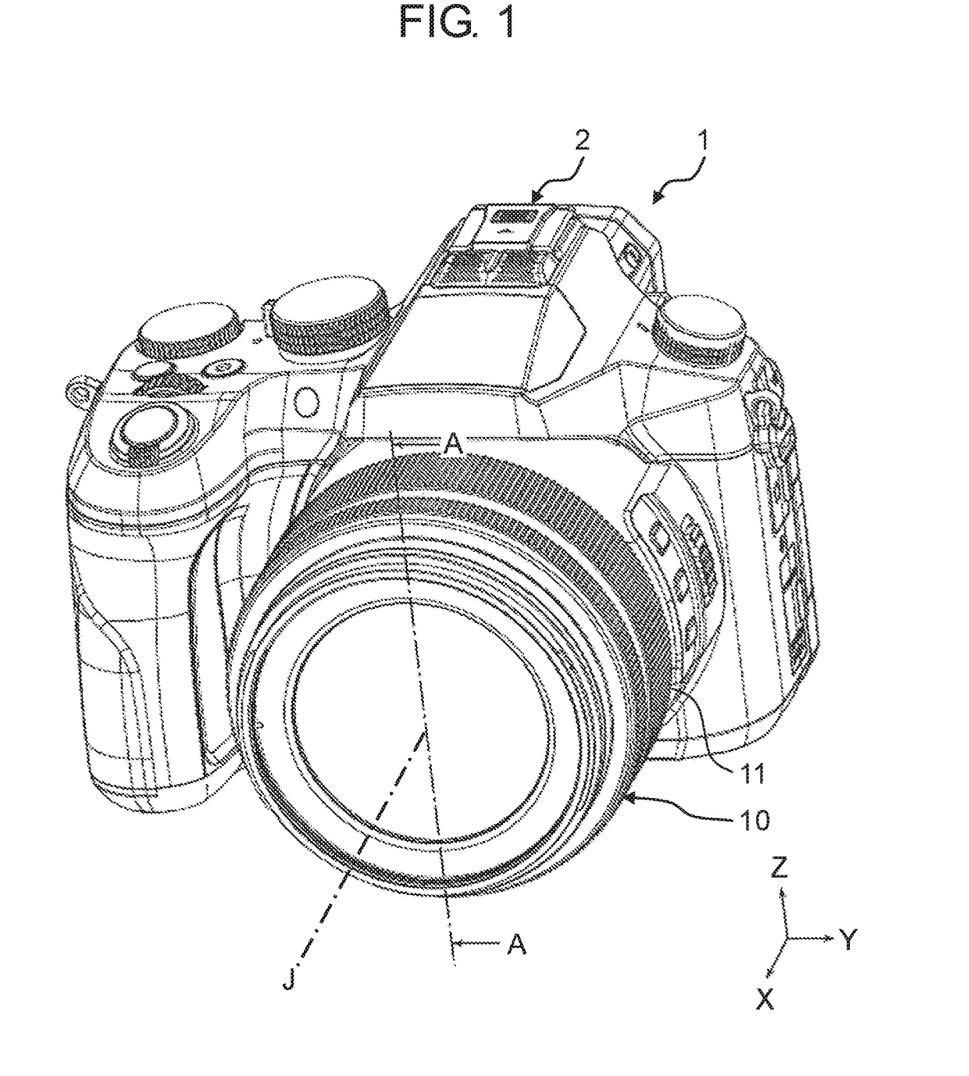
FIG. 1 is a perspective view of an image-capturing device according to an exemplary embodiment.
Figure 2:
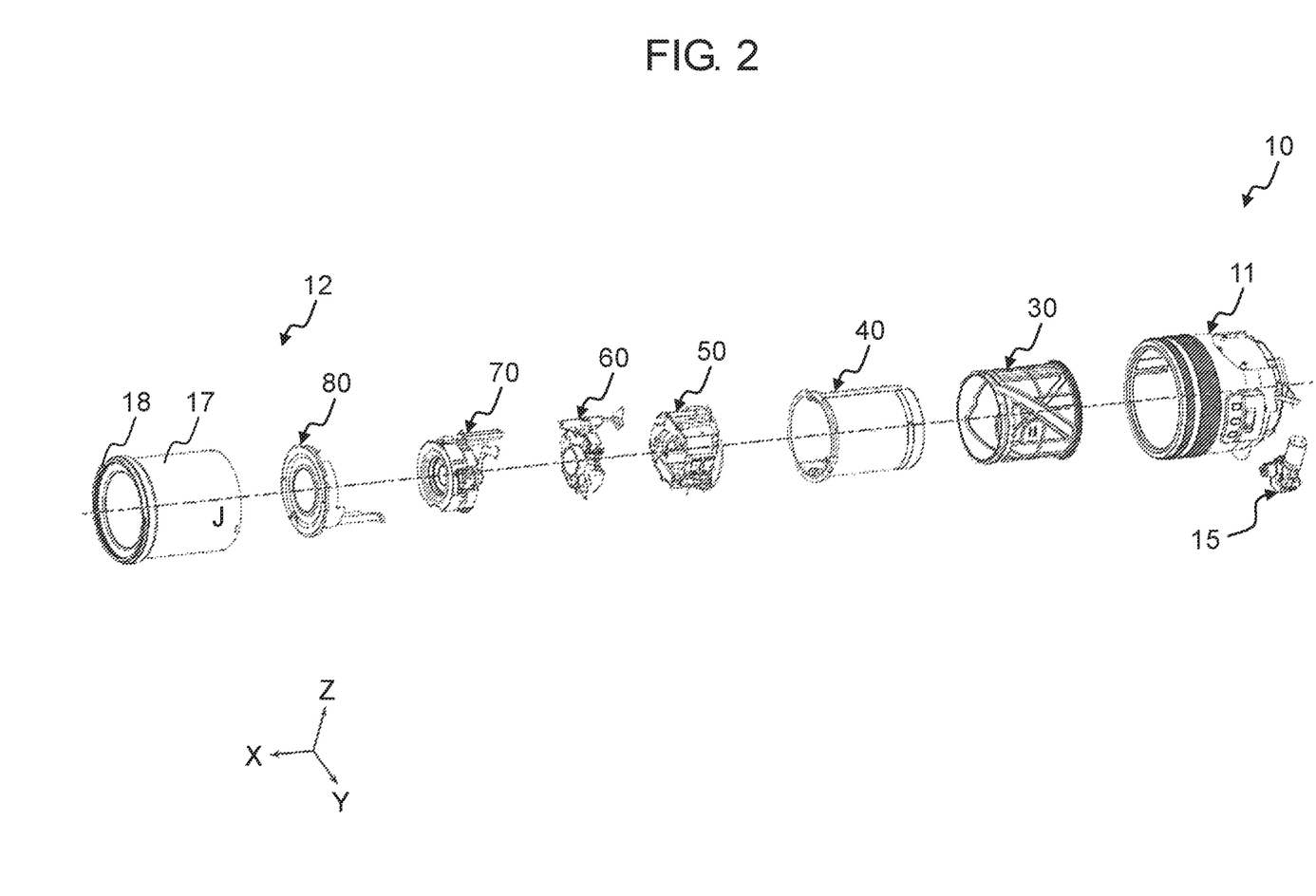
FIG. 2 is an exploded perspective view of a lens barrel of the image-capturing device according to the exemplary embodiment.
Figure 3:
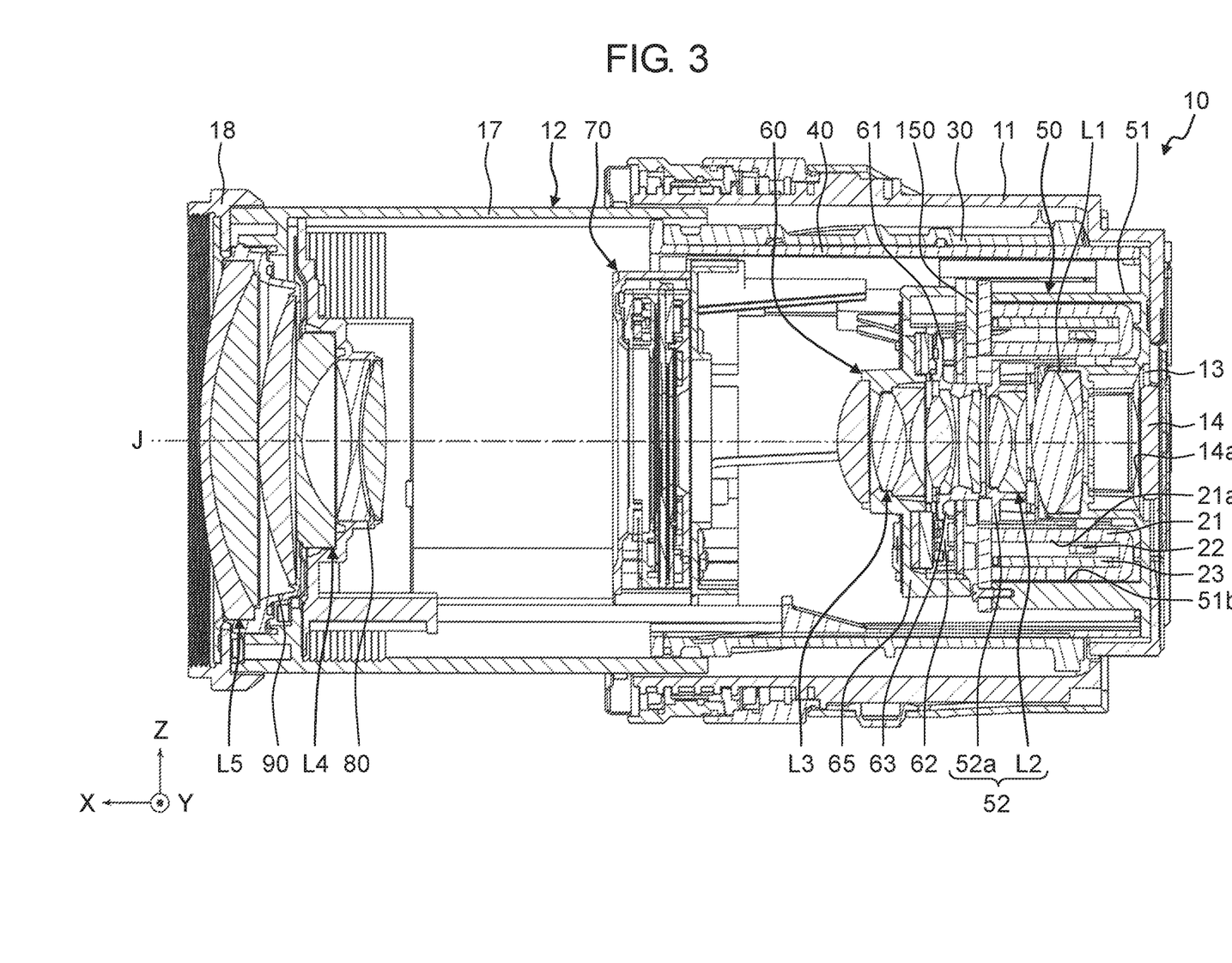
FIG. 3 is a sectional view of the lens barrel according to the exemplary embodiment taken along line A-A of FIG. 1.
Figure 4:
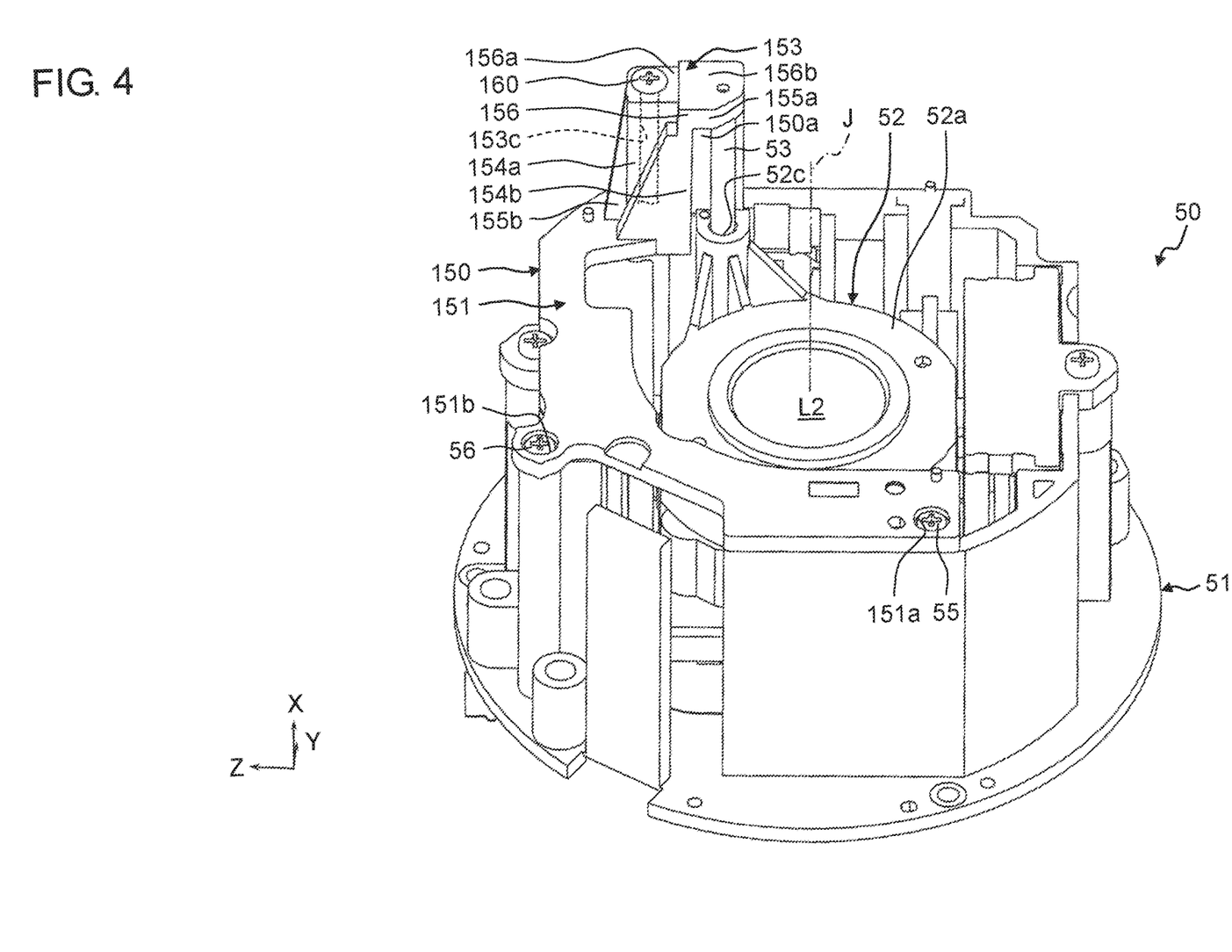
FIG. 4 is a perspective view of a first group barrel of the lens barrel according to the exemplary embodiment.
Figure 5:
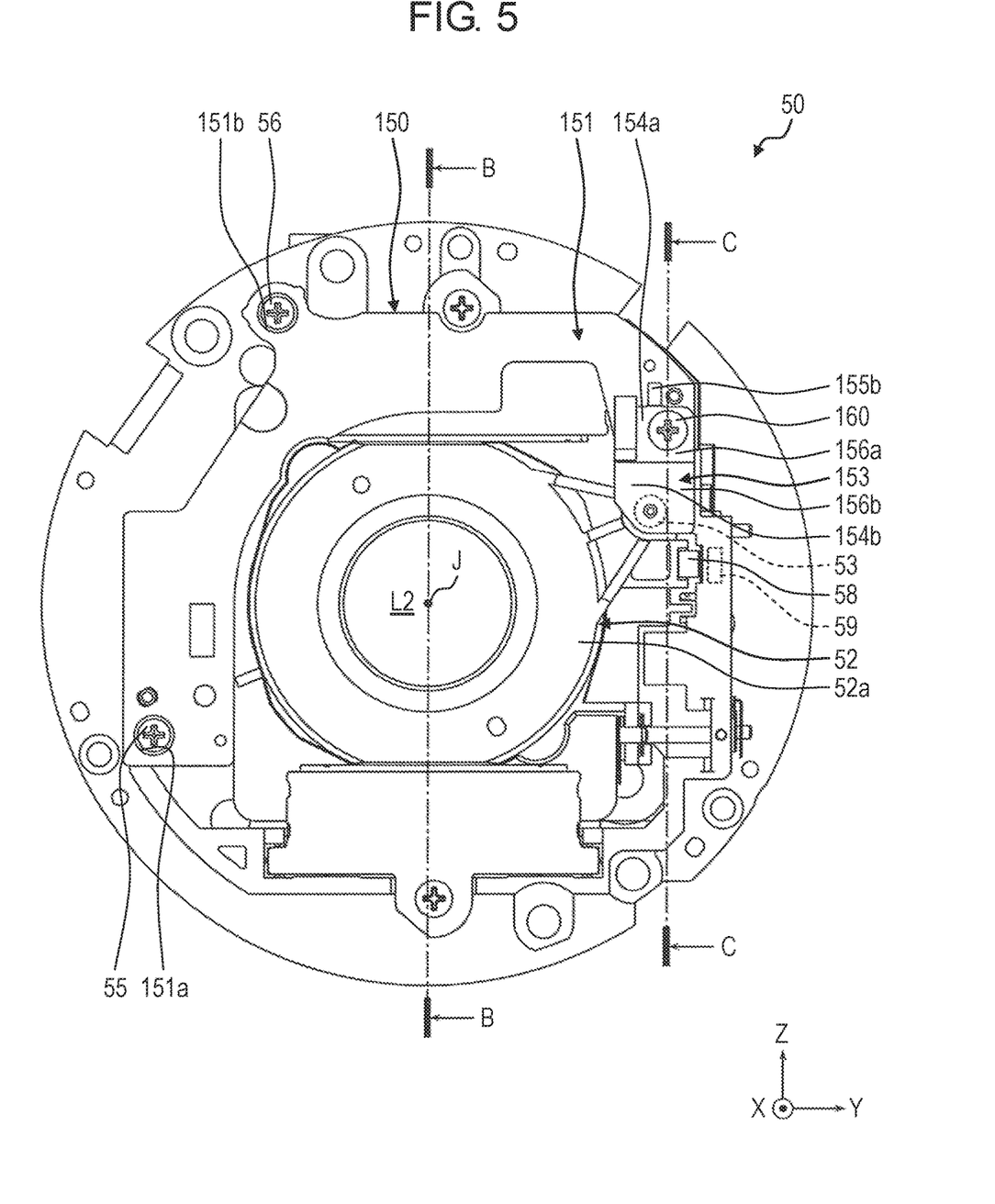
FIG. 5 is a front view of the first group barrel of the lens barrel according to the exemplary embodiment.
Figure 6:
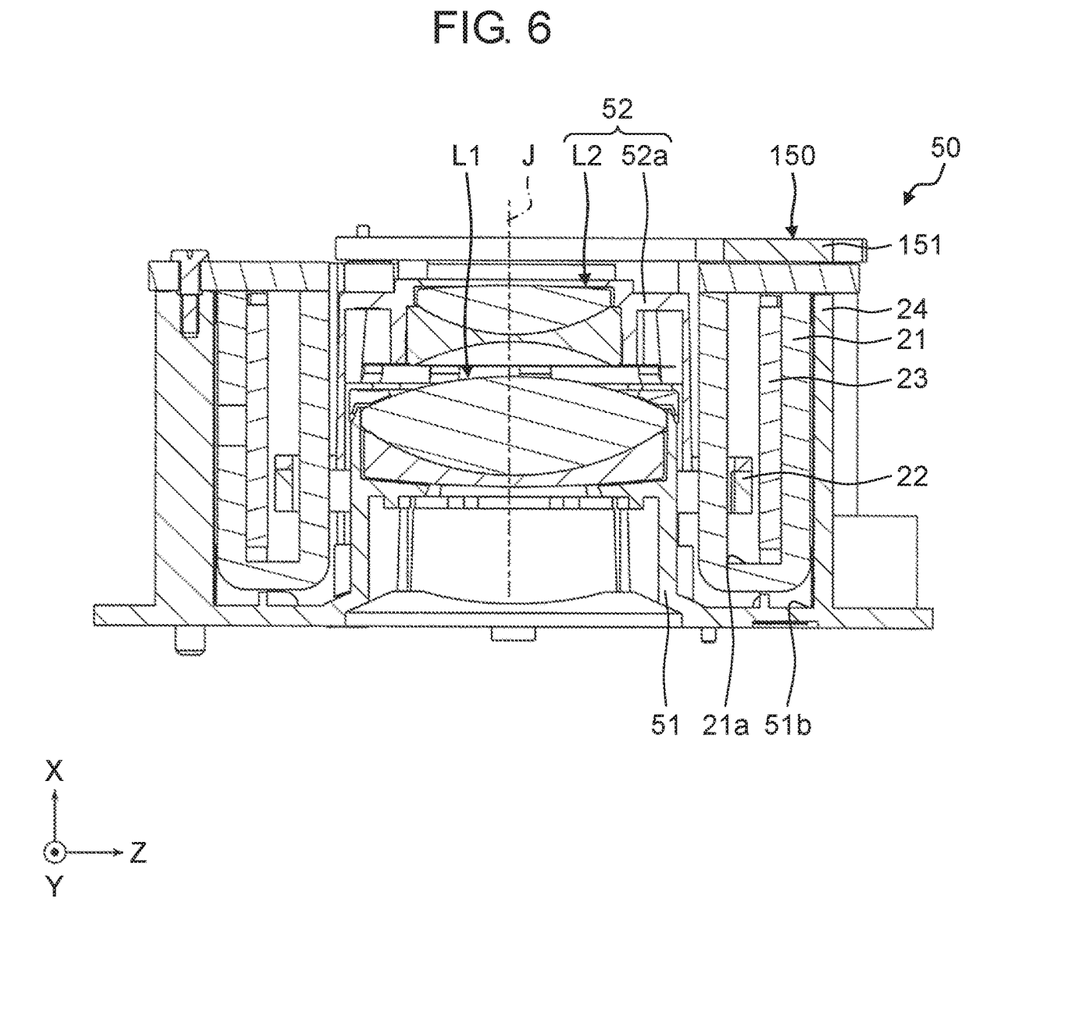
FIG. 6 is a sectional view of the first group barrel of the lens barrel according to the exemplary embodiment taken along line B-B of FIG. 5.
Figure 7:
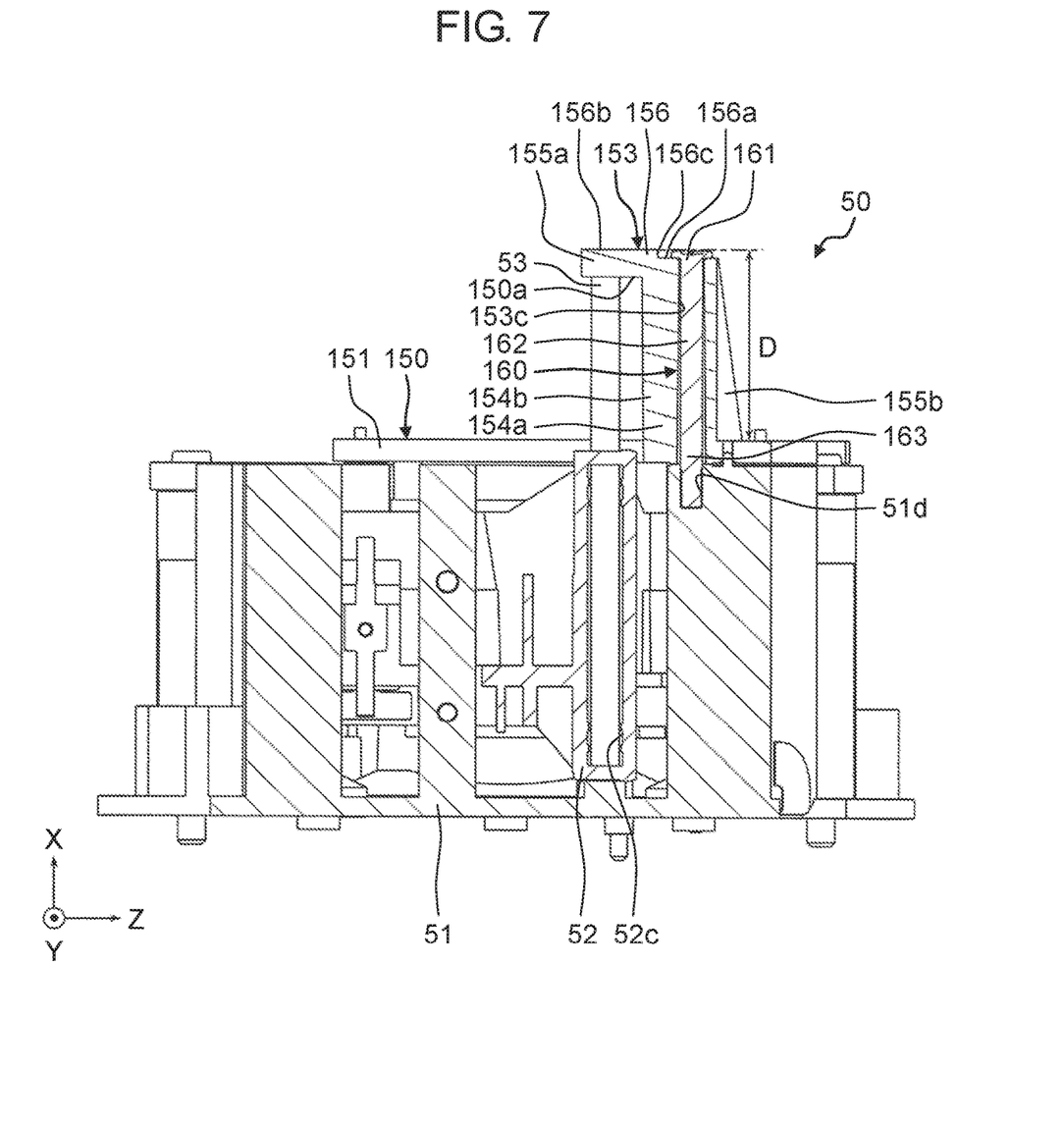
FIG. 7 is a sectional view of the first group barrel of the lens barrel according to the exemplary embodiment taken along line C-C of FIG. 5.
Figure 8:
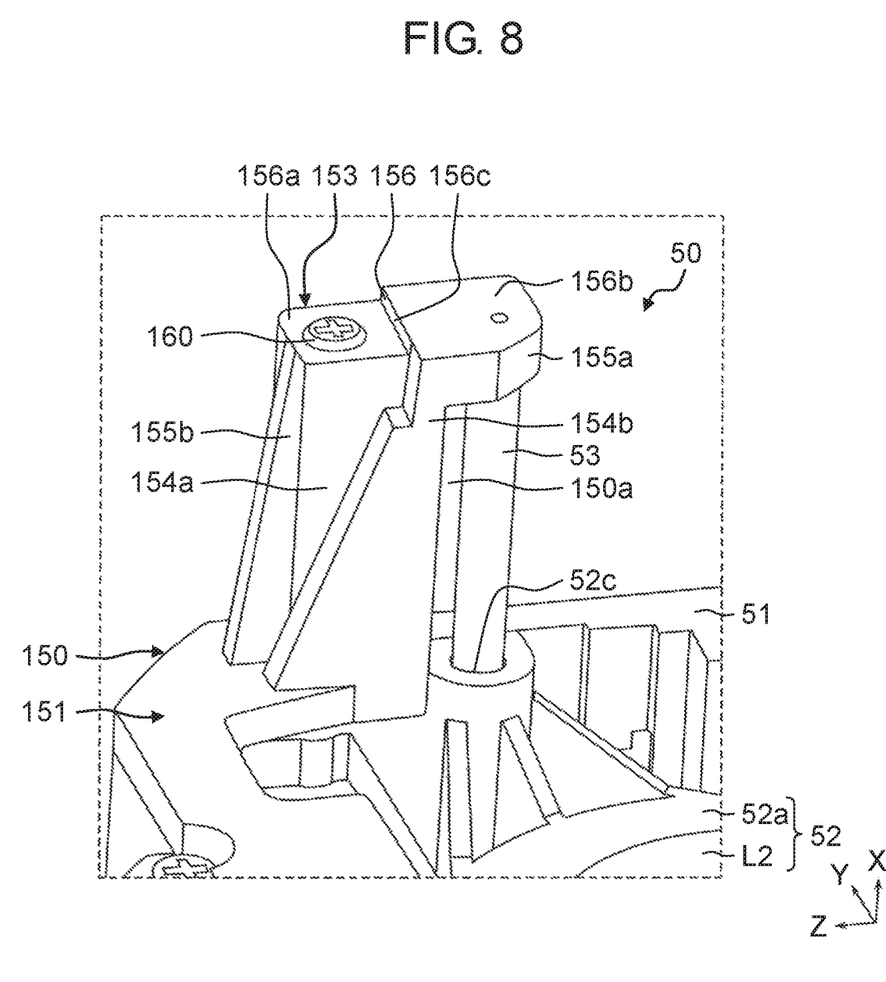
FIG. 8 is a partial enlarged view showing part of the first group barrel of the lens barrel according to the exemplary embodiment.

FIG. 1 is a perspective view of image-capturing device 1 according to the exemplary embodiment. FIG. 2 is an exploded perspective view of lens barrel 10 of image-capturing device 1 according to the exemplary embodiment. FIG. 3 is a sectional view of lens barrel 10 according to the exemplary embodiment taken along line A-A of FIG. 1. FIG. 4 is a perspective view of first group barrel 50 of lens barrel 10 according to the exemplary embodiment. FIG. 5 is a front view of first group barrel 50 of lens barrel 10 according to the exemplary embodiment. FIG. 6 is a sectional view of first group barrel 50 of lens barrel 10 according to the exemplary embodiment taken along line B-B of FIG. 5. FIG. 7 is a sectional view of first group barrel 50 of lens barrel 10 according to the exemplary embodiment taken along line C-C of FIG. 5. FIG. 8 is a partial enlarged view showing part of first group barrel 50 of lens barrel 10 according to the exemplary embodiment.

In FIG. 1, a direction parallel to optical axis J of image-capturing device 1 is defined as an X-axis direction, a horizontal direction is defined as a Y-axis direction, and a vertically upward direction is defined as a Z-axis direction. A side closer to a subject is defined as a positive side in the X-axis direction, and a side closer to imaging device 14 is defined as a negative side in the X-axis direction. In FIG. 1, the Y-axis direction and the Z-axis direction are not limited thereto, as the Y-axis direction and the Z-axis direction vary depending on actual condition during use. The same is applied to the drawings subsequent to FIG. 1.

As shown in FIG. 1, image-capturing device 1 is, for example, a digital still camera. Image-capturing device 1 includes image-capturing device body 2 and lens barrel 10.

Image-capturing device body 2 includes an image processor, a system controller, a distance measurement unit, a memory unit, a camera display unit, a camera operation unit, and the like.

As shown in FIGS. 1 and 3, the image processor converts a signal from imaging device 14 described below into an image signal. The system controller controls a shooting operation, recording, and the like of entire image-capturing device 1. The distance measurement unit measures a distance between a subject and image-capturing device 1. The memory unit includes a main memory of image-capturing device body 2 and a storage medium to be attached from the outside. The camera display unit allows aiming at a subject for shooting, reviewing setting changes, and checking preview of a photographed image. The camera operation unit allows a shooting operation and changing settings.

As shown in FIGS. 1 and 2, lens barrel 10 includes a zoom mechanism. Lens barrel 10 protrudes from image-capturing device body 2 toward the positive side in the X-axis direction during non-shooting. Lens barrel 10 is extended toward the positive side in the X-axis direction during shooting and during operation of the zoom mechanism. Lens barrel 10 may be detachable from image-capturing device body 2. Lens barrel 10 includes fixed barrel 11 and movable barrel 12.

As shown in FIGS. 1 and 3, one end (on the negative side in the X-axis direction) of fixed barrel 11 is secured to image-capturing device body 2. Fixed barrel 11 houses cam barrel 30, straight-moving frame 40, first group barrel 50, second group barrel 60, and shutter unit 70. Fixed barrel 11 includes at its bottom holding base 13 that holds imaging device 14. Imaging device 14 is an element configured to capture an image through first to fifth lens groups L1 to L5 and camera shake correction lens group 63. Imaging device 14 is, for example, a complementary metal oxide semiconductor (CMOS) unit. Imaging device 14 is configured to photoelectrically convert light from a subject into a signal and output the signal to the image processor. Holding base 13 of image-capturing device body 2 holds imaging device 14. Holding base 13 has a substantially disc shape, and holds imaging device 14 in a state in which imaging surface 14a of imaging device 14 is orthogonal to optical axis J.

As shown in FIGS. 2 and 3, cam barrel 30 is disposed inside fixed barrel 11, and is configured to rotate around optical axis J. Cam barrel 30 includes a gear unit and actuator 15 such as a direct current motor (DC motor), for example. Rotation of the DC motor is transmitted to cam barrel 30 through, for example, the gear unit meshed with an output gear of the DC motor to rotate cam barrel 30.

Cam barrel 30 includes a flange, a cam protrusion inside cam barrel 30, a cam groove inside cam barrel 30, and the like. The flange is erected circumferentially at an end on the negative side in the X-axis direction of an outer peripheral surface of cam barrel 30.

Straight-moving frame 40 has a cylindrical shape, and is disposed inside cam barrel 30. Straight-moving frame 40 is equipped with a cam follower, a cam groove, and the like. The cam follower, the cam groove, and the like of straight-moving frame 40 are disposed inside straight-moving frame 40, and engaged with a cam follower, the cam protrusion, and the like of cam barrel 30. This provides a cam mechanism to move straight-moving frame 40 in a straight line according to rotation of cam barrel 30. Straight-moving frame 40 includes first to third lens groups L1 to L3 and the like to introduce light into lens barrel 10.

As shown in FIGS. 3 and 4, first group barrel 50 includes first lens frame 51 (an example of a base frame), first lens group L1, lens frame unit 52, guide pole 53, guide cover 150, two screws 55, 56 (an example of other fastening members), and fastening member 160. Note that first lens group L1 may be included as an example of the base frame in addition to first lens frame 51.

First lens frame 51 is, for example, a resin member having a substantially cylindrical shape, and is open toward the positive side in the X-axis direction. First lens frame 51 holds first lens group L1 inside. First lens group L1 is positioned by first lens frame 51. First lens group L1 is arranged such that an optical axis of first lens group L1 substantially coincides with optical axis J of imaging device 14. First lens group L1 is positioned on the positive side in the X-axis direction relative to imaging device 14, and faces imaging surface 14a of imaging device 14. First lens frame 51 includes two threaded holes corresponding to first through hole 151a and second through hole 151b on flat plate part 151 described below, and threaded hole 51d (an example of a fastening hole) corresponding to protruding-side through hole 153c on protruding part 153 described below.

As shown in FIG. 6, first lens frame 51 has housing space 51b that houses a drive mechanism configured with a magnetic circuit including yoke 21, coil 22, and drive magnet 23.

Yoke 21 has a substantially U-shaped section, and is disposed along an inner peripheral surface of first lens frame 51. Yoke 21 has a length that is substantially the same as a thickness of first lens frame 51 in the X-axis direction. Yoke 21 has housing space 21a that is recessed toward the negative side in the X-axis direction from an end surface on the positive side in the X-axis direction of yoke 21.

Coil 22 is provided on second lens frame 52a, and is disposed in housing space 21a of yoke 21. Coil 22 is supplied with electric power from a power supply. The electric power may be supplied through flexible wiring.

Drive magnet 23 is provided outwardly from coil 22 and along an inner surface of yoke 21. An inward surface of drive magnet 23 is the north pole, and an outward surface of drive magnet 23 is the south pole. Drive magnet 23 is disposed in such a manner that magnetic flux is generated in a direction orthogonal to a direction of electric current flowing through coil 22. With this configuration, coil 22 experiences the Lorentz force and force acts in the X-axis direction. As a result, lens frame unit 52 can move along the X-axis direction.

The present exemplary embodiment employs magnet 58 as an example of a position detection member, however, the position detection member may be a reflective mirror, for example.

As shown in FIGS. 4 and 5, lens frame unit 52 is movable along the X-axis direction. Lens frame unit 52 includes second lens frame 52a, second lens group L2, and magnet 58 (an example of a position detection member). First lens frame 51 includes magnetoresistive (MR) element 59 (an example of a position detection sensor). Second lens frame 52a has a substantially cylindrical shape, and internally holds second lens group L2 at a position on the positive side in the X-axis direction relative to first lens frame 51. Second lens group L2 is provided to face first lens group L1 at a position on the positive side in the X-axis direction relative to first lens group L1 such that an optical axis of second lens group L2 substantially coincides with optical axis J of the imaging device. Second lens frame 52a includes pole insertion hole 52c through which guide pole 53 is inserted. First lens frame 51 includes a rail for guiding second lens frame 52a such that lens frame unit 52 linearly moves in the X-axis direction. The present exemplary embodiment employs MR element 59 as an example of the position detection sensor, however, a Hall element may be used as the position detection sensor instead of MR element 59.

As shown in FIG. 5, magnet 58 is provided near MR element 59 on second lens frame 52a. MR element 59 detects a change in a magnetic field of magnet 58 caused by a movement of second lens frame 52a provided with magnet 58.

MR element 59 is a sensor to detect a position of lens frame unit 52, and is provided on first lens frame 51. A position of magnet 58 relative to MR element 59 changes according to a movement of lens frame unit 52 at the time of shooting, for example. At this time, magnetic flux changes at MR element 59, and an output from MR element 59 changes accordingly. Thus, a shifted position of lens frame unit 52 can be detected by detecting the output of MR element 59. Note that the position detection sensor may be a magnetic sensor, such as MR element 59 or the Hall element, or may be a reflective photointerrupter, for example. The power may be supplied through flexible wiring.

As shown in FIG. 4, guide pole 53 is a metal member having a round pillar shape, for example, and extends substantially parallel to the X-axis direction. Guide pole 53 supports second lens frame 52a in a movable manner in the X-axis direction. In other words, guide pole 53 guides lens frame unit 52 to move along optical axis J. Guide pole 53 is fixed to (held by) first lens frame 51 of first group barrel 50 at one end (on the negative side in the X-axis direction) of guide pole 53, and fixed to (held by) guide cover 150 at the other end (on the positive side in the X-axis direction) of guide pole 53. Guide pole 53 is partly positioned in space 150a of protruding part 153.

Note that one guide pole 53 is used in the present exemplary embodiment, but a number of guide poles is not limited. Second lens frame 52a slides along guide pole 53, so that second lens group L2 can be positioned at a predetermined position.

Guide cover 150 is a cover member formed of resin, and is provided at one end on the positive side in the X-axis direction of first group barrel 50. Specifically, guide cover 150 is fixed to (held at) one end on the positive side in the X-axis direction (one end on a subject side) of first lens frame 51.

Guide cover 150 includes flat plate part 151 and protruding part 153. Flat plate part 151 and protruding part 153 are integrated with each other by insert molding, for example.

Flat plate part 151 is a flat plate having a substantially arc shape in a plan view, and is provided along part of an edge on the positive side in the X-axis direction of first lens frame 51 having a substantially cylindrical shape. Flat plate part 151 includes first through hole 151a and second through hole 151b through which two screws 55, 56 can be inserted respectively. According to the present exemplary embodiment, first through hole 151a and second through hole 151b are provided, however, other through holes may be additionally provided. Positions of first through hole 151a and second through hole 151b are not limited. First through hole 151a is provided at one end of flat plate part 151 having a substantially arc shape in a plan view. Second through hole 151b is provided near a middle portion of flat plate part 151 having a substantially arc shape in a plan view.

In the case where guide cover 150 is provided on the edge of first lens frame 51 on the positive side in the X-axis direction, first through hole 151a and second through hole 151b of flat plate part 151 respectively correspond to the threaded holes of first lens frame 51.

Two screws 55, 56 are formed of metal. One of screws 55 is inserted through first through hole 151a, and is engaged with one of the threaded holes that corresponds to first through hole 151a of first lens frame 51. The other one of screws 56 is inserted through second through hole 151b, and is engaged with the other one of the threaded holes that corresponds to second through hole 151b of first lens frame 51. With this configuration, flat plate part 151 is secured to first lens frame 51 at one end on the positive side in the X-axis direction by two screws 55, 56.

As shown in FIGS. 7 and 8, protruding part 153 is a member protruding on the positive side in the X-axis direction from a surface on the subject side of flat plate part 151 (a surface on the positive side in the X-axis direction). Length D of protruding part 153 may be set equal to or greater than about one third of a length of first group barrel 50 in the X-axis direction.

Protruding part 153 has step 156 at its tip end (at an end on the positive side in the X-axis direction). An end surface of protruding part 153 includes first flat surface 156a, second flat surface 156b, and side surface 156c. First flat surface 156a is recessed from second flat surface 156b toward the negative side in the X-axis direction. In other words, step 156 is a portion formed by projecting second flat surface 156b from first flat surface 156a toward the positive side in the X-axis direction. Side surface 156c is a wall surface erected from first flat surface 156a, which is a wall surface of step 156 ranging from first flat surface 156a to second flat surface 156b.

With reference to the surface of flat plate part 151 on the positive side in the X-axis direction, second flat surface 156b is positioned closer to a subject than first flat surface 156a is.

Protruding part 153 includes first protruding body 154a, second protruding body 154b, and rib 155b.

First protruding body 154a is a substantially square-pillar shaped member elongated in the X-axis direction. An end surface of first protruding body 154a is first flat surface 156a. First protruding body 154a has protruding-side through hole 153c that penetrates first protruding body 154a from one end to the other end of first protruding body 154a along optical axis J. In other words, protruding-side through hole 153c extends from first flat surface 156a to a surface on the negative side in the X-axis direction (a surface on imaging device 14 side) of first protruding body 154*a*. In the case where guide cover 150 is provided on the edge of first lens frame 51 on the positive side in the X-axis direction, protruding-side through hole 153*c* corresponds to threaded hole 51*d* of first lens frame 51.

Fastening member 160 is a long screw formed of metal harder than protruding part 153, and is provided substantially parallel to the X-axis direction. Fastening member 160 fastens guide cover 150 to first lens frame 51 through protruding part 153.

Specifically, fastening member 160 includes head 161, round pillar portion 162, and external threaded portion 163. Head 161 is a portion projected from first flat surface 156*a* in a fastened state. Round pillar portion 162 extends from head 161 toward the negative side in the X-axis direction. A nominal length of round pillar portion 162 may correspond to a length of protruding-side through hole 153*c*. External threaded portion 163 extends from an end of round pillar portion 162 on the negative side in the X-axis direction, further toward the negative side in the X-axis direction. External threaded portion 163 has a helical ridge and groove on its outer surface. External threaded portion 163 is engaged with threaded hole 51*d* of first lens frame 51. In this manner, fastening member 160 is engaged with threaded hole 51*d* through protruding-side through hole 153*c* to fasten protruding part 153 to first lens frame 51. In other words, fastening member 160 and two screws 55, 56 fasten guide cover 150 to first lens frame 51.

When fastening member 160 fastens guide cover 150 to first lens frame 51, a surface closer to imaging surface 14*a* of head 161 of fastening member 160 is attached firmly to first flat surface 156*a*, and a surface of guide cover 150 closer to imaging surface 14*a* is attached firmly to a surface of first lens frame 51 on the subject side, so that guide cover 150 is pressed onto first lens frame 51. With this configuration, protruding part 153 of guide cover 150 is secured to the surface of first lens frame 51 on the subject side.

Note that fastening member 160 is not limited to a long screw, and may be a screw, a bolt, or the like. Guide cover 150 is secured to first lens frame 51 with two screws 55, 56, but may be secured to first lens frame 51 with three or more screws.

Fastening member 160 is provided such that its one end opposite an engagement side (one end on the subject side) is positioned within a range from a tip of protruding part 153 (an imaginary surface extended from second flat surface 156*b*) to one half of a length of protruding part 153. Fastening member 160 is provided on first protruding body 154*a*, and thus positioned differently from two screws 55, 56 along the optical axis.

Fastening member 160 has a length in the X-axis direction that enables engagement with threaded hole 51*d* of first lens frame 51, and is equal to or greater than one half of length D of protruding part 153. According to the present exemplary embodiment, fastening member 160 is longer than protruding part 153.

It is preferable that head 161 of fastening member 160 is not positioned at the same height as heads of two screws 55, 56 that secure flat plate part 151. According to the present exemplary embodiment, head 161 of fastening member 160 is positioned on the positive side in the X-axis direction relative to the heads of two screws 55, 56. It is preferable that head 161 of fastening member 160 is not projected toward the positive side in the X-axis direction beyond the imaginary surface extended from second flat surface 156*b*, when guide cover 150 is secured to first lens frame 51. In other words, head 161 of fastening member 160 is positioned lower than or equal to the imaginary surface extended from second flat surface 156*b*, when fastening member 160 fastens guide cover 150 to first lens frame 51.

Second protruding body 154*b* is a member that is elongated in the X-axis direction, is adjacent to first protruding body 154*a* on a negative side in the Z-axis direction (a side closer to guide pole 53), and is integrated with first protruding body 154*a*. Part of second protruding body 154*b* has space 150*a* longitudinally cut out along the X-axis direction. An end surface of second protruding body 154*b* is second flat surface 156*b*.

Second protruding body 154*b* includes pressing part 155*a*. Pressing part 155*a* is a portion provided on a tip end of second protruding body 154*b* and projecting in a direction substantially orthogonal to optical axis J. An end surface of pressing part 155*a* on the negative side in the X-axis direction forms part of second flat surface 156*b*. Pressing part 155*a* secures, with its surface on the positive side in the X-axis direction, the other end (one end on the positive side in the X-axis direction) of guide pole 53.

Rib 155*b* is substantially perpendicular to flat plate part 151 and protruding part 153. Specifically, rib 155*b* is formed between a surface of flat plate part 151 on the positive side in the X-axis direction and an outer peripheral surface of first protruding body 154*a*. Rib 155*b* enhances strength between flat plate part 151 and protruding part 153. According to the present embodiment, rib 155*b* has a substantially triangle shape.

As shown in FIG. 3, second group barrel 60 includes camera shake prevention unit (OIS: optical image stabilization) 61, third lens frame 65, and third lens group L3.

Camera shake prevention unit 61 holds camera shake prevention lens frame 62 and camera shake correction lens group 63 for camera shake correction. Camera shake correction lens group 63 is positioned by camera shake prevention lens frame 62. Camera shake correction lens group 63 is arranged such that an optical axis of camera shake correction lens group 63 substantially coincides with optical axis J of imaging device 14. Camera shake correction lens group 63 faces second lens group L2 at a position on the positive side in the X-axis direction relative to second lens group L2.

Third lens frame 65 holds inside third lens group L3 for blur correction. Third lens group L3 is positioned by third lens frame 65. Third lens group L3 is arranged such that an optical axis of third lens group L3 substantially coincides with optical axis J of imaging device 14. Third lens group L3 faces camera shake correction lens group 63 at a position on the positive side in the X-axis direction relative to camera shake correction lens group 63.

As shown in FIGS. 2 and 3, shutter unit 70 is provided on straight-moving frame 40 and is held between third lens frame 65 and fourth lens frame 80. Shutter unit 70 may be fitted with the cam follower and the cam groove formed with cam barrel 30 that is configured to be rotated by actuator 15. When cam barrel 30 is rotated by actuator 15, shutter unit 70 may move in the X-axis direction.

Shutter unit 70 is configured to open and close a shutter of first lens group L1 for zooming, and is configured to perform camera shake correction with a camera shake correction unit and adjust a diaphragm with a diaphragm mechanism. Electric signals for controlling shutter unit 70, camera shake prevention unit 61, the diaphragm mechanism, and other units are transmitted through flexible wiring for signal transmission.

Movable barrel 12 is configured to extend outwardly from fixed barrel 11 (moves in a straight line on the positive side in the X-axis direction (in a direction of optical axis J)), and to be stored inside fixed barrel 11 (moves in a straight line toward the negative side in the X-axis direction). Movable barrel 12 is partly held inside fixed barrel 11.

Movable barrel 12 includes decorative frame 17, fourth lens frame 80, fifth lens frame 90, fourth lens group L4, fifth lens group L5, and filter frame 18.

Decorative frame 17 is a cylindrical housing, and is configured to extend forward relative to fixed barrel 11. Decorative frame 17 is configured to be moved by actuator 15 in the X-axis direction.

Fourth lens frame 80 and fifth lens frame 90 are secured at an end surface of decorative frame 17 on the positive side in the X-axis direction. Fourth lens frame 80 holds fourth lens group L4.

Fourth lens frame 80 is movable in a straight line in the X-axis direction inside decorative frame 17. Fourth lens frame 80 may also be moved in the X-axis direction by actuator 15 that is configured to move decorative frame 17. Fourth lens frame 80 holds fourth lens group L4 inside. Fourth lens group L4 is used for zooming.

Fourth lens group L4 is positioned by fourth lens frame 80. Fourth lens group L4 is arranged such that an optical axis of fourth lens group L4 substantially coincides with optical axis J of imaging device 14. Fourth lens group L4 faces camera shake correction lens group 63 through shutter unit 70 at a position on the positive side in the X-axis direction relative to shutter unit 70.

Filter frame 18 is engaged with decorative frame 17 at a position that is closer to a subject than fifth lens frame 90 is, so that fifth lens frame 90 is held inside decorative frame 17. Filter frame 18 has a ring shape, and has an internal thread so as to be engaged with an optical member.

Fifth lens group L5 is a lens used for zooming and is an objective lens serving as a photographing lens. Fifth lens group L5 is positioned by fifth lens frame 90. Fifth lens group L5 is arranged such that an optical axis of fifth lens group L5 substantially coincides with optical axis J of imaging device 14. Fifth lens frame 90 holds fifth lens group L5 inside. Fifth lens group L5 faces fourth lens group L4 at a position on the positive side in the X-axis direction relative to fourth lens group L4.

Comparative Example

A configuration of a lens barrel according to a comparative example is described below with reference to FIG. 9.

Figure 9:
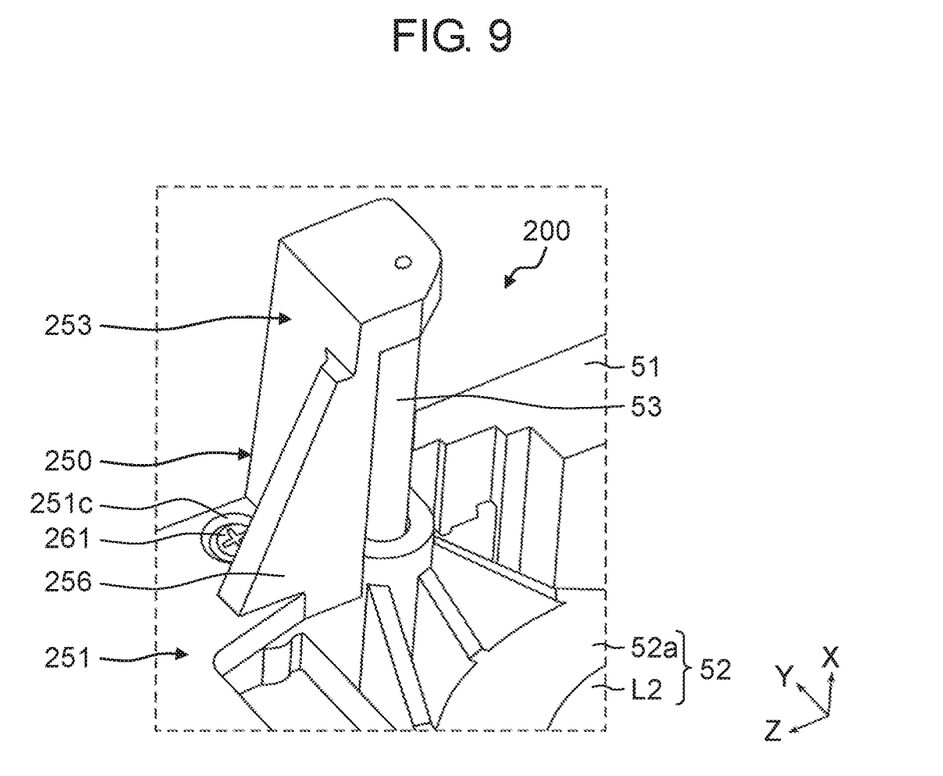
FIG. 9 is a partial enlarged view showing part of a group barrel of a lens barrel according to a comparative example.

FIG. 9 is a partial enlarged view showing part of group barrel 200 of the lens barrel according to the comparative example.

The lens barrel according to the comparative example differs from the lens barrel according to the exemplary embodiment in that protruding part 253 of guide cover 250 does not include fastening member 160 of the exemplary embodiment, and in that protruding part 253 does not include step 156 of the exemplary embodiment.

Since other configurations of the present comparative example are the same as those of the exemplary embodiment, the same components are denoted by the same reference signs and the detailed descriptions of the same components are omitted.

As shown in FIG. 9, flat plate part 251 has a third through hole 251c in addition to a first through hole and a second through hole that are the same as those in the exemplary embodiment. Third through hole 251c is provided near protruding part 253 at the other end of flat plate part 251. Protruding part 253 corresponds to second protruding body 154b of the exemplary embodiment.

In the case where guide cover 250 is provided on the edge of first lens frame 51 on the positive side in the X-axis direction, first lens frame 51 has a threaded hole corresponding to third through hole 251c.

Screws 261 respectively inserted through the first through hole, the second through hole, and third through hole 251c are engaged with threaded holes of first lens frame 51, so that guide cover 250 is secured to first lens frame 51.

Guide cover 250 includes rib 256 in addition to flat plate part 251 and protruding part 253. Rib 256 is substantially perpendicular to flat plate part 251 and protruding part 253. Rib 256 enhances strength between flat plate part 251 and protruding part 253.

According to group barrel 200 of the comparative example, guide cover 250 is screwed to first lens frame 51 at a position near protruding part 253, and rib 256 reinforces flat plate part 251 and protruding part 253. However, protruding part 253 may be shaken in a direction substantially intersecting optical axis J due to vibration or the like of an image-capturing device including group barrel 200. In other words, a shake of protruding part 253 cannot be suppressed sufficiently even with rib 256 provided. A shake of protruding part 253 due to vibration or the like may cause an unusual noise near protruding part 253, and the unusual noise may be picked up during imaging.

[Functions and Effects]

Functions and effects of lens barrel 10 and image-capturing device 1 according to the present embodiment are described below.

As described above, lens barrel 10 according to the present exemplary embodiment includes lens frame unit 52 movable along optical axis J, guide pole 53 configured to guide lens frame unit 52 along optical axis J of lens frame unit 52, first lens frame 51 holding one end of guide pole 53, guide cover 150 held by first lens frame 51, and fastening member 160 fastening guide cover 150 to first lens frame 51. Guide cover 150 includes protruding part 153 protruding along optical axis J and holding the other end of guide pole 53. Fastening member 160 fastens guide cover 150 to first lens frame 51 through protruding part 153.

With this configuration, fastening member 160 fastens guide cover 150 to the surface of first lens frame 51 on the subject side through protruding part 153. Accordingly, a shake of protruding part 153 in a direction substantially intersecting optical axis J can be suppressed by fastening member 160 more properly than the comparative example. Further, it is not necessary to enlarge protruding part 153, which eliminates the need of limitation to the size of second lens group L2.

In addition, fastening member 160 ensures strength of protruding part 153, and thus an unusual noise due to a shake of protruding part 153 hardly occurs in this lens barrel 10.

Accordingly, this lens barrel 10 can suppress a shake of guide cover 150 relative to first lens frame 51 while ensuring strength of guide cover 150.

In particular, fastening member 160 is formed of metal, thus ensuring strength of protruding part 153 formed of a resin material.

Image-capturing device 1 according to the present embodiment includes lens barrel 10.

This prevents protruding part 153 from shaking in a direction substantially intersecting optical axis J, which suppresses occurrence of an unusual noise. As a result, this image-capturing device 1 hardly picks up an unusual noise caused by vibration during imaging.

According to lens barrel 10 of the present exemplary embodiment, protruding part 153 has protruding-side through hole 153c that penetrates protruding part 153 from one end to the other end of protruding part 153 along optical axis J. First lens frame 51 has threaded hole 51d. Fastening member 160 is engaged with threaded hole 51d through protruding-side through hole 153c.

With this configuration, fastening member 160 inserted through protruding-side through hole 153c of protruding part 153 is engaged with threaded hole 51d of first lens frame 51, so that guide cover 150 can be secured to the surface of first lens frame 51 on the subject side. This allows fastening member 160 to suppress a shake of protruding part 153 caused by vibration.

According to lens barrel 10 of the present exemplary embodiment, one end of fastening member 160 opposite an end engaged with threaded hole 51d is positioned within a range from a tip of protruding part 153 to one half of length D of protruding part 153.

This configuration enhances strength of protruding part 153 as compared to protruding part 253 of the comparative example, which suppresses a shake of protruding part 153 in a direction intersecting optical axis J.

In lens barrel 10 according to the present exemplary embodiment, guide cover 150 is secured to first lens frame 51 at least two portions with screws 55, 56 (other fastening members) in addition to a portion where fastening member 160 is engaged with first lens frame 51. Fastening member 160 is located at a position different from two screws 55, 56 (other fastening members) with respect the optical axis.

With this configuration, two screws 55, 56 fasten flat plate part 151, and fastening member 160 fastens protruding part 153, so that guide cover 150 can be entirely secured to first lens frame 51.

In lens barrel 10 according to the present exemplary embodiment, lens frame unit 52 includes a position detection member. First lens frame 51 includes a position detection sensor configured to detect a position of lens frame unit 52.

According to the present exemplary embodiment, a position detection member is included in lens frame unit 52, and a position detection sensor is included in lens frame 51. However, a configuration in which a position detection sensor is included in lens frame unit 52, and a position detection member is included in lens frame 51 can be employed.

In lens barrel 10 according to the present exemplary embodiment, the position detection member is magnet 58 or a reflective mirror. The position detection sensor is a magnetic sensor or a reflective sensor.

A shifted position of lens frame unit 52 is detected by these components.

Modification of Exemplary Embodiment

First group barrel 350 according to a modification of the exemplary embodiment is described below with reference to FIG. 10.

Figure 10:
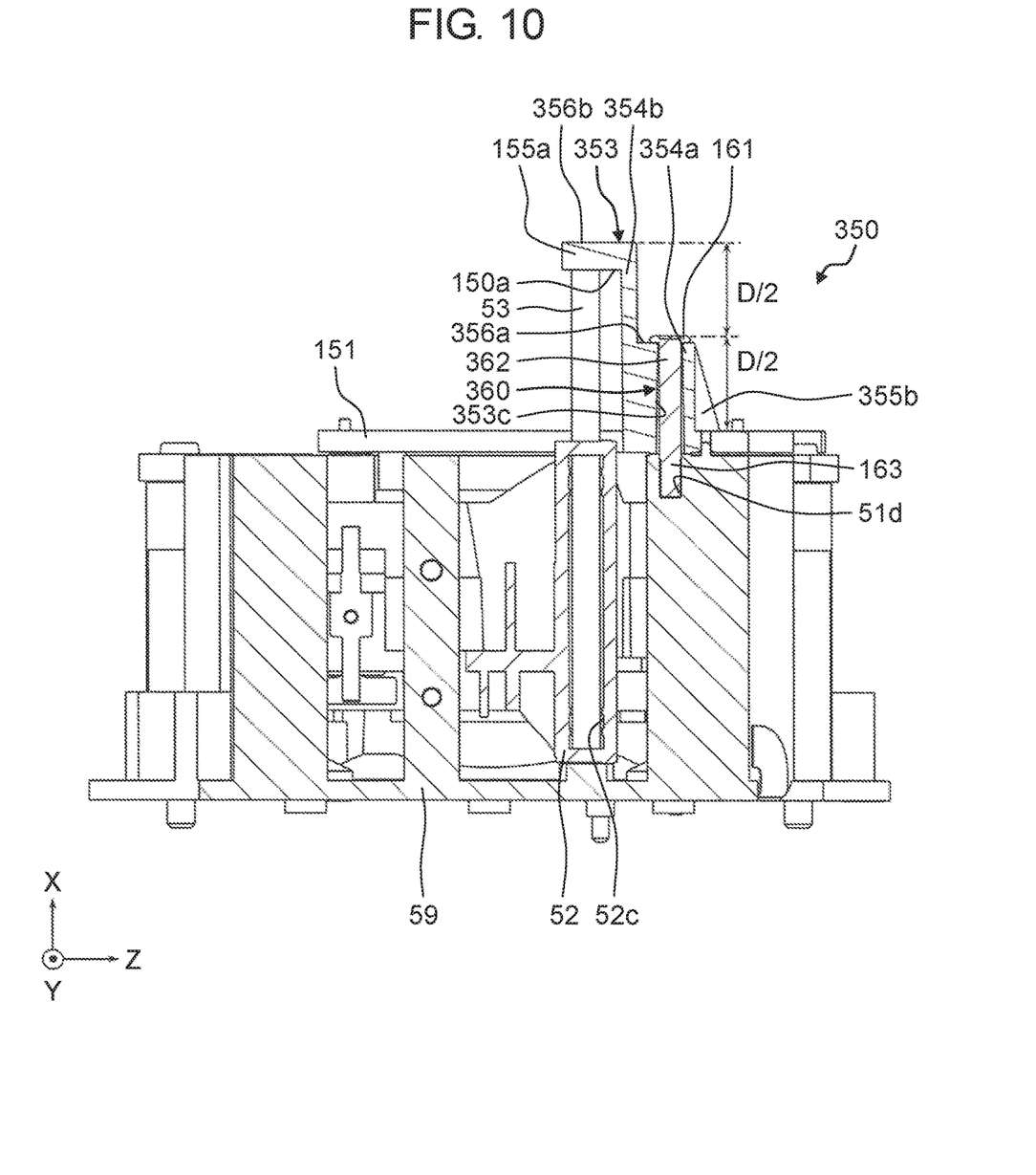
FIG. 10 is a sectional view of a first group barrel of an image-capturing device according to a modification of the exemplary embodiment.

FIG. 10 is a sectional view of first group barrel 350 of an image-capturing device according to the modification of the exemplary embodiment.

The modification of the exemplary embodiment differs from the exemplary embodiment in that a tip end of fastening member 360 (on the positive side in the X-axis direction) is located at a position about half of length D of protruding part 353.

Since other configurations of the image-capturing device according to the present modification of the exemplary embodiment are the same as those of image-capturing device 1 according to the exemplary embodiment, the same components are denoted by the same reference signs and the detailed descriptions of the same components are omitted.

As shown in FIG. 10, fastening member 360 according to the modification of the exemplary embodiment is shorter than fastening member 160 according to the exemplary embodiment by about half of length D. Specifically, round pillar portion 362 of fastening member 360 is shorter than round pillar portion 162 according to the exemplary embodiment.

Protruding-side through hole 353c of protruding part 353 is also shorter than fastening member 160 according to the exemplary embodiment by about half of length D. In other words, first flat surface 356a according to the modification of the exemplary embodiment is located lower than first flat surface 156a according to the exemplary embodiment by about half of length D.

While second protruding body 354b has the same length as that of the exemplary embodiment, first protruding body 354a according to the modification of the exemplary embodiment is shorter than first protruding body 154a according to the exemplary embodiment by about half of length D. Rib 355b is provided according to the length of first protruding body 354a.

According to the present modification of the exemplary embodiment, one end of fastening member 360 on the subject side is located in a range from a tip end of second protruding body 354b (an imaginary surface extended from second flat surface 356b) to a position about half of length D of protruding part 353.

First group barrel 350 like this also enhances strength of protruding part 353 as compared to protruding part 253 of the comparative example, which suppresses a shake of protruding part 353 in a direction intersecting optical axis J.

Since fastening member 360 may have any length that is equal to or greater than half of length D of protruding part 353, an increase in manufacturing costs can be suppressed as compared to a case in which a long fastening member is used.

The present modification of the exemplary embodiment achieves other functions and effects similar to those achieved by the exemplary embodiment.

(Other Modifications and the Like)

Although the lens barrel and the image-capturing device of the exemplary embodiment and the modification of the exemplary embodiment have been described on the basis of the exemplary embodiment and the modification of the exemplary embodiment, the present disclosure is not limited to the exemplary embodiment and the modification of the exemplary embodiment.

For example, a plurality of the movable barrels may be provided according to the exemplary embodiment. For example, a second movable barrel may be extended from a first movable barrel, and a third movable barrel may be extended from the second movable barrel. A configuration with three movable barrels is cited as an example, but a number of movable barrels is not limited thereto. The second movable barrel is configured to be stored in the first movable barrel, and the third movable barrel is configured to be stored in the second movable barrel.

The first group barrel according to the above exemplary embodiment may be used for preventing a camera shake, for focusing, for zooming, and the like.

According to the above exemplary embodiment, a yoke, a drive magnet, and the like may be provided on a lens frame unit, and a magnet, an MR element, and the like may be provided on the first lens frame.

The exemplary embodiment and the modification of the exemplary embodiment have been described above as illustrations of the technique disclosed in the present disclosure. The accompanying drawings and the detailed description have been provided for this purpose.

Therefore, the components described in the accompanying drawings and the detailed description may include not only components necessary to solve problems but also components unnecessary to solve the problems, in order to illustrate the above technique. Such non-essential components therefore should not be instantly construed as being essential, based on the fact that such non-essential components are illustrated and described in the accompanying drawings and the detailed description.

The above exemplary embodiment is provided to exemplify the technique according to the present disclosure, and thus various changes, replacements, additions, omissions, and the like can be made within the scope of the claims and equivalents thereof.

INDUSTRIAL APPLICABILITY

The present disclosure is applicable to an image-capturing device configured to image a subject.

REFERENCE MARKS IN THE DRAWINGS

1: image-capturing device
10: lens barrel
22: coil
23: drive magnet
51: first lens frame (base frame)
51$d$: threaded hole (fastening hole)
52: lens frame unit
53: guide pole
55, 56: screws (other fastening members)
58: magnet (position detection member)
59: MR element (position detection sensor)
150: guide cover
151: flat plate part
153$c$, 353$c$: protruding-side through hole
153, 353: protruding part
160, 360: fastening member

The invention claimed is:

1. A lens barrel comprising:
a lens frame unit movable along an optical axis;
a guide pole configured to guide the lens frame unit along the optical axis of the lens frame unit;
a base frame holding one end of the guide pole;
a guide cover held by the base frame; and
a fastening member fastening the guide cover to the base frame,
wherein the guide cover includes a protruding part that protrudes along the optical axis and opposite the base frame, and holds another end of the guide pole,
the fastening member fastens the guide cover to the base frame through the protruding part, and
one end of the fastening member opposite an end engaged with the fastening hole is positioned within a range from a tip of the protruding part to one half of a length of the protruding part.

2. The lens barrel according to claim 1,
wherein the protruding part has a protruding-side through hole that penetrates the protruding part from one end to another end of the protruding part along the optical axis,
the base frame has a fastening hole, and
the fastening member is engaged with the fastening hole through the protruding-side through hole.

3. The lens barrel according to claim 1,
wherein the guide cover further includes a flat plate part that is an arc-shaped flat plate, and
the flat plate part and the protruding part are integrated with each other by molding.

4. The lens barrel according to claim 3,
wherein the guide cover is secured to the base frame at at least two portions with other fastening members in addition to a portion where the fastening member is engaged with the base frame, and
the fastening member is located at a position different from positions where the other fastening members are mounted with respect to the optical axis.

5. An image-capturing device comprising the lens barrel according to claim 1.

* * * * *